United States Patent Office 3,453,156
Patented July 1, 1969

3,453,156
COMPOSITE PROPELLANT COMPOSITIONS CONTAINING POLYSILOXANES WITH ALKENYL GROUPS
Clarence Bertram Hackett, Kilmarnock, Patrick McAvoy Kelly, Saltcoats, and John Macgilchrist, Ardrossan, Scotland, assignors to Imperial Chemical Industries Limited, Millbank, London, England, a corporation of Great Britain
No Drawing. Filed Mar. 10, 1965, Ser. No. 440,066
Claims priority, application Great Britain, Mar. 23, 1964, 12,247/64
Int. Cl. C06b *1/00, 11/00*
U.S. Cl. 149—19    15 Claims This invention relates to a new composite propellant composition suitable for use in gas generators and cartridge actuated devices.

Composite propellants generally comprise an oxidising material such as an inorganic perchlorate or nitrate dispersed in a binding material, which binding material also provides fuel for reaction with the oxidising material. In U.S. Patent 2,949,352 the use of silicone rubber as binding material for rocket propellants has been proposed in order to increase the ignition temperature thereof, to improve the cohesive quality during burning and to improve adhesion to the motor casing during burning. The silicone rubbers proposed were those in which $R^1$ and $R^2$ substituent groups directly bonded to the silicon atoms in the general formula

were selected from the group consisting of alkyl radicals having from 1 to 3 carbon atoms and monocyclic aryl radicals having from 6 to 8 carbon atoms.

The method of prepartion of the propellent proposed in U.S. Patent 2,949,352 comprised mixing together a silicon gum, prepared by hydrolysing and heating an appropriate dihydrocarbon substituted dihalosilane, an oxidising material and a curing catalyst and heating the mixture to set the gum to a rubber.

We have found that with these propellents, when formed into free-standing grains (i.e. not case-bonded), as may be required for some gas generator applications, there is a tendency for some of the oxidising material to separate when the surface of the cured propellent charge is subjected to mild abrasion, and we have further discovered that the propellent can be improved in this respect if the silicone binder is prepared from a polysiloxane composition comprising a proportion of acyclic alkenyl radicals. Preparation of polysiloxane compositions and the curing of such compositions to rubbers and resins are described in "Organosilicon Compounds" by C. Eaborn (Butterworths: 1960).

Thus, in accordance with the present invention, a propellent composition suitable for use in a gas generator or cartridge actuated device comprises an oxidising material dispersed in a silicone rubber or resin prepared by curing a polysiloxane composition comprising a proportion of acyclic alkenyl groups bonded to silicon atoms of the polysiloxane chain. The effects of the alkenyl group substituents is to enhance the cross-linking density in the rubber or resin.

It is normally preferred that the acyclic alkenyl groups should constitute from 0.1 to 25% by weight of the substituent groups in the polysiloxane chain. It is further preferred that these groups be vinyl groups. Other substituent groups in the polysiloxane chain may conveniently include methyl, ethyl or phenyl groups. The polysiloxane composition may also contain a proportion of hydrogen atoms bonded to silicon atoms.

The oxidising material may conveniently constitute from 50 to 90% by weight of the propellent, although the preferred composition contains about 80%. The particle size of the oxidiser may range from 10 to 750 microns in diameter.

The oxidising material may conveniently comprise perchlorates or nitrates of alkali metals or ammonia. The ammonium salts, however, are less heat stable than the corresponding metal salts and are not suitable for storage at temperatures above 220° C.

The propellent of the present invention may conveniently be prepared by mixing together a polysiloxane capable of being cured to a rubber or resin, an oxidising material and a curing catalyst, and heating the mixture to cure the polysiloxane. We prefer to use a polysiloxane having from 4 to 15,000 Si atoms in its molecular chain and to cure it to a rubber or resin at a temperature not exceeding 150° C. Suitable curing catalysts include benzoyl peroxide and ditertiary butyl peroxide. The platinum metals, viz. ruthenium, rhodium, palladium, osmium, iridium and platinum and platinum metal complexes described in our co-pending U.K. application No. 33,682/62 are particularly effective as curing catalysts when used in conjunction with a cross-linking agent such as, for example, a polysiloxane containing hydrogen atoms attached to silicon atoms. A complex of platinous chloride and cyclohexene is preferred.

The invention is further illustrated by the following examples in which all parts and percentages are by weight.

Example 1

The silicone composition used in this example was prepared by blending:
100 parts of an organopolysiloxane gum of viscosity $1 \times 10^6$ cs. and consisting of 0.2 molar percent methylvinylsiloxane units and 99.8 molar percent dimethyl siloxane units in the polysiloxane chain.
15 parts of a fume silica having a surface area of 175 sq. m./g. and an average particle size of 3 to 40 m$\mu$.
2 parts dimethylpinacoxysilane.
30 parts of this silicone composition, 70 parts potassium perchlorate (passed 200 B.S.S. mesh) and 1.0 part 2:4 dichlorobenzoyl peroxide were intimately mixed together in a blending machine. The mixture was extruded by pressing through a one inch diameter nozzle, cut into lengths and heater at 120° C. for 30 minutes to cure the composition to a rubber.

The cured composition had a burning speed of 8″/second at 5 tons/sq. in. at ambient temperature and was stable to heating at 250° C. It was a suitable propellent for gas generators and cartridge actuated devices. There was no sign of any segregation of the constituents when the composition was rubbed firmly by hand.

Example 2

The silicone used in this example was organopolysiloxane fluid, containing 20 molar percent methylvinyl siloxane units and 80 molar percent of dimethylsiloxane units in the polysiloxane chain and end-stopped with trimethylsilyl units. It had an average viscosity of 3000 cs.

80 parts potassium perchlorate (passed 200 B.S.S. mesh). 20 parts of the above silicone, 0.2 part cyclohexane platinous chloride solution (0.35 g. of cyclohexene platinous chloride in 100 g. of benzene) and 5 parts trimethylsilyl end-stopped methylhydrogenpolysiloxane (average M.W. 3000) were intimately mixed together. The mixture was cast in a mould and cured by heating for 30 minutes at 100° C.

The cured propellent had a burning speed of 0.5″/second at 500 p.s.i. at ambient temperature and was suitable for use in gas generators and cartridge actuated devices. It did not exhibit surface segregation when the surface was firmly rubbed by hand.

What we claim is:

1. A composite propellent composition suitable for gas generators and cartridge actuated devices comprising an oxidizing material dispersed in a silicone binder material selected from the group consisting of silicone rubber and silicone resin, prepared by curing a polysiloxane composition comprising a proportion of acyclic alkenyl groups bonded to silicon atoms of the polysiloxane chain.

2. A propellent composition as claimed in claim 1 wherein the acyclic alkenyl groups constitute from 0.1 to 25% by weight of the substitutent groups in the polysiloxane chain.

3. A propellent composition as claimed in claim 1 wherein the acylclic alkenyl groups are vinyl groups.

4. A propellent composition as claimed in claim 1 wherein the polysiloxane chain contains a substituent selected from the group consisting of methyl, ethyl or phenyl groups.

5. A propellent composition as claimed in claim 1 comprising 50 to 90% by weight of oxidizing material.

6. A propellent composition as claimed in claim 1 wherein the particle size of the oxidizing material ranges from 10 to 750 microns in diameter.

7. A propellent composition as claimed in claim 1 wherein the oxidizing material comprises a compound selected from the group consisting of alkali metal perchlorate, ammonium perchlorate, alkali metal nitrate and ammonium nitrate.

8. A propellent composition as claimed in claim 7 wherein the oxidizing material comprises potassium perchlorate.

9. A process for the preparation of a propellent composition as claimed in claim 1 which comprises mixing together a polysiloxane capable of being cured to a rubber or resin, an oxidizing material and a free radical curing catalyst, and heating the mixture to cure the polysiloxane to a rubber or resin.

10. A process as claimed in claim 9 wherein the polysiloxane contains from 4 to 15,000 Si atoms in its molecular chain.

11. A process as claimed in claim 9 wherein the mixture is cured at a temperature not exceeding 150° C.

12. A process as claimed in claim 9 wherein the curing catalyst comprises a compound selected from the group consisting of benzoyl peroxide or ditertiary butyl peroxide.

13. A composite propellent composition prepared by a process as claimed in claim 9.

14. A process for the preparation of a propellent composition as claimed in claim 1 in which comprises mixing together a polysiloxane capable of being cured to a rubber or resin, an oxidizing material and a curing catalyst selected from the group consisting of platinum metal or a platinum metal complex in conjunction with a cross-linking agent comprising polysiloxane containing hydrogen atoms attached to silicone atoms.

15. A process as claimed in claim 14 wherein the platinum metal complex comprises a complex of platinous chloride and cyclohexene.

References Cited

UNITED STATES PATENTS

| | | | |
|---|---|---|---|
| 2,902,355 | 9/1959 | Eckels | 149—19 X |
| 2,949,352 | 8/1960 | Cramer | 149—19 |
| 3,022,149 | 2/1962 | Cramer | 149—19 |
| 3,053,709 | 9/1962 | Herty | 149—19 |
| 3,190,776 | 6/1965 | Ender | 149—19 X |
| 3,403,061 | 8/1968 | McDonald | 149—7 |

BENJAMIN R. PADGETT, *Primary Examiner.*

U.S. Cl. X.R.

149—20